United States Patent [19]

Bothe et al.

[11] Patent Number: 4,997,700
[45] Date of Patent: Mar. 5, 1991

[54] BIAXIALLY ORIENTED POLYPROPYLENE FILM FOR METALLIZING APPLICATIONS

[75] Inventors: Lothar Bothe, Mainz-Gonsenheim; Gunter Schloegl, Kelkheim, both of Fed. Rep. of Germany

[73] Assignee: Hoechst Aktiengesellschaft, Frankfurt am Main, Fed. Rep. of Germany

[21] Appl. No.: 413,281

[22] Filed: Sep. 27, 1989

[30] Foreign Application Priority Data

Sep. 28, 1988 [DE] Fed. Rep. of Germany ....... 3832880

[51] Int. Cl.$^5$ .............................................. B32B 15/08
[52] U.S. Cl. .................................... 428/216; 428/220; 428/323; 428/461; 428/464; 428/516
[58] Field of Search ............... 428/461, 213, 220, 323, 428/331, 332, 516, 216

[56] References Cited

U.S. PATENT DOCUMENTS

| 4,345,005 | 8/1982 | All et al. | 428/461 |
| 4,357,383 | 11/1982 | Howden et al. | 428/213 |
| 4,604,322 | 8/1986 | Reid | 428/332 |
| 4,883,698 | 11/1989 | Bothe et al. | 428/516 X |

FOREIGN PATENT DOCUMENTS

| 0021672 | 1/1981 | European Pat. Off. | 428/461 |
| 0236945 | 9/1987 | European Pat. Off. | 428/323 |
| 0282917 | 9/1988 | European Pat. Off. | 428/461 |
| 3701307 | 7/1988 | Fed. Rep. of Germany | 428/516 X |
| 2201407 | 9/1988 | United Kingdom | 428/331 |

Primary Examiner—Thomas J. Herbert
Attorney, Agent, or Firm—Foley & Lardner, Schwartz, Jeffery, Schwaab, Mack, Blumenthal & Evans

[57] ABSTRACT

A metallizable, heat-sealable, biaxially oriented multilayer film for metallizing applications is described which comprises a base layer comprising polypropylene, a first polyolefinic heat-sealable surface layer and a second polyolefinic metallizable surface layer. The second polyolefinic metallizable surface layer comprises a propylene-ethylene copolymer, which has an ethylene content of 1.2 to 2.8% by weight, a distribution factor $V_F$ greater than 10, an enthalpy of fusion $\Delta H_m$ greater than 90 J/g and a thermo-oxidation temperature $T_{ox}$ greater than 240° C.

16 Claims, No Drawings

BIAXIALLY ORIENTED POLYPROPYLENE FILM FOR METALLIZING APPLICATIONS

BACKGROUND OF THE INVENTION

The invention relates to a metallizable, heat-sealable, biaxially oriented multi-layer film which comprises a base layer comprising polypropylene, a first polyolefinic heat-sealable surface layer and a second polyolefinic metallizable surface layer.

EP-A No. 0,023,389 describes a coextruded multi-layer film for metallizing applications which comprises a core layer essentially of polypropylene, which has outer layers of an ethylene-olefin copolymer on both sides, the ethylene content being 85 to 99.75% by weight and the molecule of the alpha olefin containing 3 to 6 carbon atoms. This film has the disadvantage that its scratch resistance is in need of improvement and its gloss is unsatisfactory.

Moreover, EP-A No. 0,021,672 describes a laminate produced by coextrusion, comprising a polypropylene core layer and an ethylene-propylene copolymer on at least one external side of the core layer. The outer layer contains 2 to 4% by weight of ethylene, outer layers with 2.5 to 3.5% by weight of ethylene being particularly preferred. A good adhesion between the outer layer and an applied metal layer is achieved by omitting lubricants, particularly fatty acid amides, from the film. However, this film is still in need of improvement, particularly with regard to the metal adhesion, its scratch resistance and its optical properties.

DE-A No. 3,701,307 describes heat-sealable multi-layer films for metallizing applications whose metallizable surface layer is of polypropylene. These films have the disadvantage that they cannot readily be surface treated, i.e., that they have a poor long-term metallizability, since their affinity for metals, achieved by surface treatment, significantly and detectably subsides even after a short time.

SUMMARY OF THE INVENTION

Accordingly, it is an object of the present invention to provide a metallizable film having good processing properties during winding, cutting, metallizing, printing or extrusion coating or lamination and smooth passage through packaging machines.

Another object of the present invention is to provide a film the metal adhesion of which is very good and in particular remains constant for a relatively long time.

A further object of the present invention is to provide a film having a good optical appearance, in particular a high gloss of the metal layer of the metallizable surface.

Still another object of the present invention is to provide a film having a high scratch resistance under mechanical influences.

Yet another object of the present invention is to provide a film having good heat sealing properties and low odor.

In accomplishing the foregoing objectives, there has been provided, in accordance with one aspect of the present invention, a film as described above comprising a base layer comprising polypropylene; a first polyolefinic heat-sealable surface layer; and a second polyolefinic metallizable surface layer comprising a propylene-ethylene copolymer which has an ethylene content of 1.2 to 2.8% by weight, a distribution factor $V_F$ greater than 10, an enthalpy of fusion $\Delta H_m$ greater than 90 J/g and a thermo-oxidation temperature $T_{ox}$ greater than 240° C.

Other objects, features and advantages of the present invention will become apparent to those skilled in the art from the following detailed description. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

DETAILED DESCRIPTION OF THE PREFERRED EMBODIMENTS

The ethylene content and the distribution factor of the copolymer are determined with the aid of $C_{13}$ NMR spectroscopy. The measurements were carried out using a nuclear resonance spectrometer model HX-270 supplied by Bruker (Germany), which was equipped with a computer of the type Bruker Aspect 2000, supplied by Bruker.

The ethylene-propylene copolymer to be characterized is dissolved in a solvent mixture made from 65% by volume of hexachlorobenzene and 35% by volume of 1,1-di-deuterotetrachloroethane, so that a 10% by weight solution resulted. Octamethyltetrasiloxane (OMTS) was added as reference standard. The 67.9 MHZ $C_{13}$ nuclear resonance spectrum was measured at 130° C. The evaluation of the spectra was carried out in accordance with the procedure described in J. C. Randall, Polymer Sequence Distribution (Academic Press, New York, 1977).

The distribution factor is defined as $$V_F = \frac{C_i}{C_G - C_i}$$

in which $C_G$ denotes the total content of ethylene in the copolymer in % by weight and $C_i$ denotes the proportion of ethylene in % by weight, which is present as isolated ethylene component, i.e., a single ethylene building block is located between two propylene building blocks in the manner illustrated as follows:

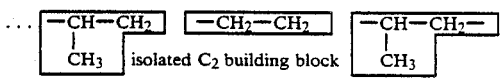

The enthalpy of fusion $\Delta H_m$ is determined using the method of differential scanning calorimetry (DSC measurement). A few milligrams (3 to 5 mg) of the raw material to be characterized are heated in a differential calorimeter at a heating rate of 20° C./min. The enthalpy of fusion $\Delta H_m$ of the raw material is obtained from the area below the corresponding fusion peak.

The base line on either side of the fusion peak is delineated by a linear tangent.

The idealized thermo-oxidation temperature $T_{ox}$ is determined in the following manner:

2 to 5 mg of the raw material to be investigated are heated in a differential calorimeter at a heating rate of 20 K/min. Air is used as the purging gas, the outlet temperature being 295° K. The measurements show the change in heat flow with increasing temperature. While, after fusion, this curve for the raw material initially runs almost horizontally (base line), these values sharply increase as a result of oxidation from a certain temperature (exotherm branch).

The idealized thermo-oxidation temperature is defined as the intercept of the straight line projection of the exotherm branch of the thermogram with the base line.

Surprisingly, it was observed that the parameters mentioned for the propylene-ethylene copolymer of the second polyolefinic metallizable surface layer of the film according to the invention must be kept within very narrow limits, in order to simultaneously optimize all of the properties mentioned in the object statement. The ethylene content and the distribution factor $V_F$ of the copolymer are of importance for the suitability for surface treatment by means of electrical corona discharge, for the long-term metallizability and for the optical properties. If the ethylene content is below 1.2% by weight, the suitability for corona treatment is poor and the subsidence characteristics of the treatment effect are unfavorable. If the ethylene content is above 2.8% by weight or the distribution factor is below 10, the optical properties, particularly the surface gloss are impaired.

The scratch resistance of the film is influenced by the enthalpy of fusion of the copolymer. If the latter is below 90 J/g, the scratch resistance is significantly impaired.

The thermo-oxidation temperature is of particular importance for metal adhesion. If the thermo-oxidation temperature of the metallizable outer layer is below 240° C., degradation products resulting from the corona treatment form on the surface to such an extent that the adhesion is impaired during subsequent metallizing.

The base layer of the multi-layer film according to the invention comprises a propylene polymer containing a predominant proportion of propylene and preferably having a melting point of 150° to 170° C. Isotactic polypropylene with an n-heptane-soluble component of 15% by weight or less, copolymers of ethylene and propylene with an ethylene content of 5% by weight or less, copolymers of propylene with ($C_4$-$C_5$)-alpha-olefins having an alpha-olefin content of 5% by weight or less are preferred propylone polymers for the base layer, and isotactic polypropylene is most particularly preferred. The propylene polymer of the base layer generally has a melt flow index of 1.5 to 5 g/10 min. at 230° C. and under a load of 2.16 kg (DIN 53 735).

The first polyolefinic heat-sealable surface layer of the multi-layer film according to the invention comprises heat-sealable olefinic polymers. Suitable alpha-olefin polymers are polymers containing ethylene, copolymers of ethylene and propylene, or ethylene or propylene and 1-butene or other alpha-olefins having 5 to 10 carbon atoms, terpolymers of ethylene, propylene and butylene or another alpha-olefin having 5 to 10 carbon atoms or mixtures of these polymers. Ethylene-propylene copolymers, ethylene-butylene copolymers, propylene-butylene copolymers, ethylene-propylene-butylene terpolymers or mixtures of these polymers are preferably used. Alpha-olefin polymers which are particularly preferred for the heat sealing layer are ethylene-propylene copolymers with propylene as the main component and an ethylene content of 4 to 10% by weight. The heat sealing raw material has a lower melting point than the propylene polymer of the base layer. The melting point is generally in the range of 80° to 150° C., preferably 100° to 140° C. The melt flow index of the heat sealing raw material is higher than that of the propylene polymer of the base layer. The olefin polymer for the heat sealing layer generally has a melt flow index of 3 to 15 g/10 min., preferably 3 to 9 g/10 min., at 230° C. and under a load of 2.16 kg (DIN-53-735).

The metallizable surface layer comprises an ethylene-propylene copolymer, which preferably has an ethylene content of 1.4 to 1.8% by weight, a distribution factor $V_F$ of more than 10, particularly of more than 15, an enthalpy of fusion $\Delta H_m$ of more than 90 J/g, particularly in the range of from 95 to 110 J/g, and a preferred thermo-oxidation temperature $T_{ox}$ of more than 245° C. The melt flow index of the copolymer for the second poly-olefinic metallizable surface layer is preferably between about 3 and 12 g/10 min., but is in any case higher than that of the propylene polymer of the base layer.

The first polyolefinic heat-sealable surface layer may contain an anti-blocking agent in order to further improve certain properties of the polyolefin film according to the invention.

Suitable anti-blocking agents for this layer are inorganic additives such as silicon dioxide, calcium carbonate, magnesium silicate and/or anti-blocking agents such as for example polyamide, polyester and particularly benzo-guanamine-formaldehyde copolymers and the like. In the case of the antiblocking agent, the average particle size should be between 1 and 4 $\mu$m and the shape ratio should be less than 3. Silicon dioxide and calcium carbonate are preferred as antiblocking agents. These agents are particularly preferably used when they are spherical in shape. Spherical inorganic materials of this type and addition thereof to films made from thermo-plastic synthetic materials are described for example in EP-A No. 0,236,945 and in DE-A No. 3,801,535. The amount of antiblocking agent added is about 0.1 to 1% by weight, preferably 0.1 to 0.3% by weight, relative to the total weight of the first polyolefinic heat-sealable surface layer.

The second polyolefinic metallizable surface layer preferably contains a polynuclear phenolic stabilizer with a molecular weight of more than 300 g/mol, preferably more than 700 g/mol. In particular, pentaerythrityl tetrakis-3-(3,5-di-tert.-butyl-4-hydroxyphenyl)-propionate or 1,3,5-trimethyl-2,4,6-tris(3,5-di-tert.-butyl-4-hydroxybenzyl)benzene are particularly suitable as stabilizer for the copolymer of the second polyolefinic metallizable surface layer. The amount added is about 0.2 to 0.6% by weight, preferably 0.3 to 0.4% by weight. An inorganic, particulate substance is preferably used for neutralizing the catalyst residues of the copolymer. Calcium carbonates with an average particle size of at most 0.07 $\mu$m, with an absolute particle size of less than 5 $\mu$m and with a specific surface of at least 40 m$^2$/g are preferably used. The amount added is about 0.01 to 0.05% by weight.

The total thickness of the film according to the invention is between about 10 and 70 $\mu$m, preferably between 15 and 50 $\mu$m, the surface layers each having a thickness of about 0.5 to 1 $\mu$m. The film can be metallized by conventional processes and is distinguished by having a very good metal adhesion.

The production of the polyolefin film according to the invention comprising three layers is carried out by the known coextrusion process. Operation of this process thus includes coextruding through a flat film die the melt corresponding to the individual layers of the film, cooling the film obtained by coextrusion in order to harden it, biaxially stretching (orienting) the film, heat-setting the biaxially stretched film and corona treating the metallizable surface layer intended for corona treatment. The biaxial stretching (orientation) may be carried out simultaneously or successively, the successive biaxial stretching, in which the film is initially stretched longitudinally (in the machine direction) and then transversely (perpendicular to the machine direction) being preferred. The polymer or the polymer mixture of the individual layers is therefor initially compressed or liquefied in an extruder as in conventional coextrusion processes. The melts are then simultaneously pressed through a flat film die (slot die), and the extruded multi-layer film is cooled and hardened on one or more rolls, which are kept at about 30° to 50° C. by cooling. The film thus obtained is then stretched longitudinally and transversely relative to the extrusion direction, which produces an orientation of the molecule chains. The film is preferably stretched to a ratio of (4 to 7):1 in the longitudinal direction and preferably to a ratio of (8 to 10):1 in the transverse direction. The longitudinal stretching is preferably carried out at a film temperature of 120° to 140° C. and the transverse stretching preferably at 160° to 175° C. The longitudinal stretching is expediently carried out with the aid of two rolls running at different speeds according to the stretch ratio desired and the transverse stretching with the aid of a corresponding tenter frame. Biaxial stretching of the film is followed by heat-setting (heat treatment) of the film. For this, the film is kept for about 0.5 to 10 s at a temperature of 150° to 160° C. The corona treatment is preferably carried out with an alternating voltage of about 10,000 V and 10,000 Hz, The film which has been produced in this manner is wound up in the customary manner with the aid of a wind-up unit.

The polyolefin multi-layer film according to the invention is particularly suitable for metallizing applications. In fact, it has all the important properties which are required of polyolefin films with regard to their use as heat-sealable metallized film. In particular, the said polyolefin multi-layer film according to the invention displays:

very good optical properties, particularly the gloss of the metallizable surface, high scratch resistance of the metallizable surface, good immediate and long-term metallizability characteristics, high suitability for surface treatment and good odor properties, good further processing characteristics, good heat-sealing characteristics.

The invention will now be further described with the aid of exemplary embodiments.

In the examples and comparison examples below, in each case biaxially oriented polyolefin films are used (longitudinal stretch ratio 5:1, transverse stretch ratio 10:1) having a base layer and two outer layers, the base layer in each case comprising an isotactic polypropylene with an n-heptane-soluble component of 4% by weight, with a melting point of 165° C. and a melt flow index of 3.5 g/10 min. at 230° C. and under a load of 2.16 kg (DIN 53 735) as the main component. The base layer is in each case about 28 μm thick, and the two outer layers, which enclose the base layer, are each about 1 μm thick. The triple-layer polyolefin films were produced by the known coextrusion process.

EXAMPLE 1

The first polyolefinic heat-sealable outer layer comprised a copolymer of ethylene building blocks and propylene building blocks with an ethylene content of 6% by weight, a propylene content of 93.7% by weight and 0.3% by weight of $SiO_2$ with an average particle diameter of 2 μm and a shape ratio of 1. The percentage data relate to the total weight of the first polyolefinic heat-sealable outer layer. The melt flow index $i_{2.16}$ of the polymer of the first outer layer was 8 g/10 min., and its melting point was 136° C.

The second polyolefinic metallizable outer layer comprised a copolymer of ethylene building blocks and propylene building blocks with an ethylene content of 1.9% by weight, a propylene content of 97.7% by weight and a content of pentaerythrityl tetrakis-3-(3,5-di-tert.-butyl-4-hydroxyphenyl)propionate of 0.35% by weight, the percentage data relating to the total weight of the second polyolefinic outer layer. The neutralization of the polymers was carried out with 0.05% by weight of calcium carbonate with an average particle diameter of 0.02 μm and a specific surface area of 100 $m^2/g$. The polymer had the following properties:

distribution factor $V_F = 19$
enthalpy of fusion $\Delta H_m = 95$ J/g
idealized thermo-oxidation temperature $T_{ox} = 255°$ C.
melt flow index $i_{2.16} = 5$ g/10 min.

The properties measured on the film of Example 1 are contrasted with the properties of the films from the following comparison examples in the form of a table at the end of the description.

COMPARISON EXAMPLE 1

The first polyolefinic outer layer of the film according to Comparison Example 1 had the identical composition to that of the film of Example 1. The second polyolefinic outer layer had an ethylene content of 2% by weight, a propylene content of 97.9% by weight, a stabilizer content (stabilizer as in Example 1) of 0.05% by weight and neutralizing agent (as in Example 1) at 0.05% by weight. The polymer had the following properties:

distribution factor $V_F = 19$
enthalpy of fusion $\Delta H_m = 95$ J/g
idealized thermo-oxidation temperature $T_{ox} = 225°$ C.
melt flow index $i_{2.16} = 5$ g/10 min.

The properties of the film can be seen from the table.

COMPARISON EXAMPLE 2

The first polyolefinic outer layer of the film according to Comparison Example 2 had the identical composition to that of the film of Example 1. The second polyolefinic outer layer had an ethylene content of 2.9% by weight, a propylene content of 96.7% by weight, a stabilizer content (stabilizer as in Example 1) of 0.35% by weight and neutralizing agent (as in Example at 0.05% by weight. The polymer had the following properties:

distribution factor $V_F = 14$
enthalpy of fusion $\Delta H_m = 80$ J/g
idealized thermo-oxidation temperature $T_{ox} = 255°$ C.
melt flow index $i_{2.16} = 5.5$ g/10 min.

The properties of the film can be seen from the table.

COMPARISON EXAMPLE 3

The first polyolefinic outer layer of the film according to Comparison Example 3 had the identical composition to that of the film in Example 1. The second polyolefinic outer layer had an ethylene content of 3.9% by weight, a propylene content of 95.7% by weight, a stabilizer content sizing agent (as in Example 1) at idealized thermo-oxidation temperature $T_{ox}=255°$ C. melt flow index $i_{2.16}=5$ g/10 min.

The properties of the film can be seen from the following table.

TABLE

|  | Haze | Gloss | Scratch Resistance | Suitability for Surface Treatment | Metal Adhesion Short-Term/Long-Term | | Odor | Scrap Characteristics |
| --- | --- | --- | --- | --- | --- | --- | --- | --- |
| Example No. 1* | ++ | ++ | ++ | ++ | ++ | ++ | ++ | ++ |
| CE 1 | ++ | ++ | ++ | ++ | +− | +− | ++ | ++ |
| CE 2 | −+ | −+ | −+ | ++ | +− | +− | −− | ++ |
| CE 3 | −+ | −+ | −− | ++ | +− | +− | −− | ++ |
| CE 4 | ++ | ++ | ++ | −− | +− | −− | +− | −− |
| CE 5 | −− | −− | ++ | −+ | +− | −− | +− | −− |
| CE 6 | ++ | ++ | ++ | −− | +− | −− | +− | −− |

*metallizable or metallized side
++ very good
+− good
−+ average
−− poor
CE Comparison Example 0.05% by weight. The polymer had the following properties:
distribution factor $V_F=7$
enthalpy of fusion $\Delta H_m=72$ J/g
idealized thermo-oxidation temperature $T_{ox}=255°$ C.
melt flow index $i_{2.16}=7$ g/10 min.
The properties of the film can be seen from the table.

COMPARISON EXAMPLE 4

The first polyolefinic outer layer of the film according to Comparison Example 4 had the identical composition to that of the film in Example 1. The second polyolefinic outer layer had an ethylene content of 0.5% by weight, a propylene content of 99.15% by weight, a stabilizer content (stabilizer as in Example 1) of 0.3% by weight and neutralizing agent (as in Example 1) at 0.05% by weight. The polymer had the following properties:
distribution factor $V_F=\geq 20$
enthalpy of fusion $\Delta H_m=110$ J/g
idealized thermo-oxidation temperature $T_{ox}=255°$ C.
melt flow index $i_{2.16}=5$ g/10 min.
The properties of the film can be seen from the table.

COMPARISON EXAMPLE 5

The first polyolefinic outer layer of the film according to Comparison Example 5 had the identical composition to that of the film in Example 1. The second polyolefinic outer layer had an ethylene content of 2% by weight, a propylene content of 97.6% by weight, a stabilizer content (stabilizer as in Example 1) of 0.35% by weight and neutralizing agent (as in Example 1) at 0.05% by weight. The polymer had the following properties:
distribution factor $V_F=3$
enthalpy of fusion $\Delta H_m=108$ J/g
idealized thermo-oxidation temperature $T_{ox}=255°$ C.
melt flow index $i_{2.16}=5.2$ g/10 min.
The properties of the film can be seen from the table.

COMPARISON EXAMPLE 6

The first polyolefinic outer layer of the film according to Comparison Example 6 had the identical composition to that of the film in Example 1. The second polyolefinic outer layer comprised a propylene homopolymer with the following properties:
enthalpy of fusion $\Delta H_m=125$ J/g The measuring methods initially mentioned were used in order to characterize the properties of the raw materials and the films which had been prepared. Furthermore, the haze of the film was measured in accordance with ASTM D 1003-52, a 1° slit aperture being used instead of a 4° circular aperture and the haze was given in percent for four stacked layers of film. The four layers were selected so that the optimum measuring range could thereby be used. The haze evaluation was made with $\leq 15\%$ = very good, $\geq 15\%$ to 25% = average and $>25\%$ = poor.

The gloss of the films was determined using a reflectometer supplied by Dr. Lange, Neuss (Germany) and the measuring angle was 85°.

The scratch resistance was determined in accordance with DIN 53 754. For determining the scratch resistance, the abrasion measuring device Taber Model 503 Abraser supplied by Teledyne Taber was used, for which abrasion wheels of the trademark Calibrade R H18 were used, these being loaded with 250 g. Scratch resistance or scratch susceptibility is understood to mean the increase in haze of the scratched film in comparison with the original film after 50 revolutions of the test plate. The scratch resistance is described as very good when the increase in haze is <20%, as average when the increase in haze is 20 to 25% and as poor at increases in haze which exceed 25%.

The corona treatment of the film surface was carried out in such a way that the treated film surface had, in each case, a treatment intensity of 39 mN/m immediately after the treatment. The treatment intensity was determined by the so-called ink method (DIN 53 364).

The measurement of treatment intensity was repeated at intervals of 14 days. The subsidence characteristics were described as very good if the treatment intensity was still at least 37 mN/m after four months ($\Delta B \leq 2$ mN/m). The subsidence characteristics were described as poor if the treatment intensity was less than 35 mN/m ($\Delta B \geq 4$ mN/m).

The odor of the films was assessed by means of an odor test.

A stack of films (DIN A 4) about 1 cm thick was prepared from the film to be assessed, the stack being enclosed in Al-foil. In order to assess the odor, the stack of films was separated after 2 days storage and the odor between the film layers was sampled.

Odor classification

++ low odor
+− detectable odor
−− strong odor

Suitability for corona treatment

The films were subjected under identical conditions to electrical corona treatment. While in the case of Example 1 and of the Comparison Examples VB 1 to VB 3, treatment intensities of 39 mN/m were reached, the film according to VB 5 reached an intensity of only 37 mN/m, despite identical processing, and the films according to VB 4 and VB 6 reached a treatment intensity of only 36 mN/m.

Metal adhesion 14 days after being produced (short-term assessment) and 4 months after being produced (long-term assessment) the films were metallized with aluminum. The metal adhesion was assessed using the adhesive tape test. If no metal at all could be removed by the adhesive tape, the metal adhesion was described as very good. In the case of slight removal of metal, the metal adhesion was described as good and in the case of considerable metal removal, it was described as poor.

The melt flow index was determined in each case in accordance with DIN 53 735 at 230° C. and under a load of 2.16 kg.

What is claimed is:

1. A metallizable, heat-sealable, biaxially oriented multi-layer film for metallizing applications comprising a base layer comprising polypropylene, a first polyolefinic heat-sealable surface layer and a second polyolefinic metallizable surface layer comprising a propylene-ethylene copolymer which has an ethylene content of 1.2 to 2.8% by weight, a distribution factor $V_F$ greater than 10, an enthalpy of fusion $\Delta H_m$ greater than 90 J/g and a thermooxidation temperature $T_{ox}$ greater than 240° C.

2. A film as claimed in claim 1, wherein the copolymer of said second polyolefinic surface layer has an ethylene content of 1.4 to 1.8% by weight, a distribution factor $V_F$ of more than 15, an enthalpy of fusion $\Delta H_m$ in the range of from about 95 to 110 J/g and a thermo-oxidation temperature $T_{ox}$ of more than 245° C.

3. A film as claimed in claim 1, wherein said copolymer of said second polyolefinic metallizable surface layer has a melt flow index between about 3 and 12 g/10 min.

4. A film as claimed in claim 1, wherein said film has a total thickness of between about 10 and 70 μm, the surface layers each having a thickness of about 0.5 to 1 μm.

5. A film as claimed in claim 4, wherein said film has a total thickness of 15 to 50 μm.

6. A film as claimed in claim 1, wherein the first polyolefinic heat-sealable surface layer further comprises an antiblocking agent in an amount in the range of from about 0.1 to 1% by weight, relative to the weight of the surface layer, the antiblocking agent having an average particle diameter in the range of from about 1 to 4 μm and a shape ratio of less than 3.

7. A film as claimed in claim 6, wherein spherical inorganic or organic particles are used as said antiblocking agent.

8. A film as claimed in claim 1, wherein said second polyolefinic metallizable surface layer further comprises as a stabilizer a polynuclear, sterically hindered phenol in an amount in the range of from about 0.2 to 0.6% by weight, relative to the total weight of the surface layer, the molecular weight of said stabilizer being greater than 300 g/mol.

9. A film as claimed in claim 8, wherein said stabilizer has a molecular weight of more than 700 g/mol and is used in an amount of 0.3 to 0.4% by weight, relative to the total weight of the surface layer.

10. A film as claimed in claim 1, wherein said film has a metallization layer on its second polyolefinic metallizable surface layer deposited by vacuum evaporation of aluminum.

11. A film as claimed in claim 10, wherein said metallization layer is deposited by vacuum evaporation of a metal.

12. A film as claimed in claim 11, wherein said metal is aluminum.

13. A metallized film as claimed in claim 10, wherein the free side external to said metallization layer bears a protective coating made from a polyolefin.

14. A metallized film as claimed in claim 13, wherein the protective coating comprises polyethylene.

15. A composite material comprising a transparent or opaque plastic film and a metallized film as claimed in claim 13.

16. A composite material comprising a paper layer and a metallized film as claimed in claim 13.

* * * * *